(12) United States Patent
Berger

(10) Patent No.: US 11,288,876 B2
(45) Date of Patent: Mar. 29, 2022

(54) ENHANCED TECHNIQUES FOR VOLUMETRIC STAGE MAPPING BASED ON CALIBRATION OBJECT

(71) Applicant: Magic Leap, Inc., Plantation, FL (US)

(72) Inventor: Kai Berger, Lake Forest, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/118,306

(22) Filed: Dec. 10, 2020

(65) Prior Publication Data

US 2021/0183152 A1    Jun. 17, 2021

Related U.S. Application Data

(60) Provisional application No. 62/948,106, filed on Dec. 13, 2019.

(51) Int. Cl.
| | | |
|---|---|---|
| *G06T 19/00* | (2011.01) | |
| *G06T 7/00* | (2017.01) | |
| *G06T 7/55* | (2017.01) | |
| *G06T 19/20* | (2011.01) | |

(52) U.S. Cl.
CPC ............ *G06T 19/006* (2013.01); *G06T 7/001* (2013.01); *G06T 7/55* (2017.01); *G06T 19/20* (2013.01); *G06T 2200/24* (2013.01); *G06T 2207/10028* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,850,221 B1 | 2/2005 | Tickle | |
| 9,600,929 B1 * | 3/2017 | Young | .................... G06T 1/60 |
| 2006/0028436 A1 | 2/2006 | Armstrong | |
| 2007/0081123 A1 | 4/2007 | Lewis | |
| 2011/0001791 A1 * | 1/2011 | Kirshenboim | .......... G06T 17/00 |
| | | | 348/43 |
| 2012/0127062 A1 | 5/2012 | Bar-Zeev et al. | |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Frank S Chen
(74) *Attorney, Agent, or Firm* — Knobbe, Martens, Olson & Bear, LLP

(57) ABSTRACT

Enhanced techniques for volumetric stage mapping based on a calibration object are described. An example method includes obtaining a plurality of images of a calibration object, the images being obtained from a plurality of image sensors positioned about the calibration object, and the calibration object having location information associated with a volumetric capture surface on which the calibration object is located; generating, based on the images, a reconstructed object associated with the calibration object, the reconstructed object representing a three-dimensional representation of the calibration object; determining reconstruction quality information associated with the reconstructed object, the determination being based on a ground-truth representation of the calibration object; and outputting the reconstruction quality information.

23 Claims, 10 Drawing Sheets

(56) References Cited

U.S. PATENT DOCUMENTS

| | | | |
|---|---|---|---|
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0163731 | A1* | 6/2014 | Shi ................. B25J 9/1669 700/250 |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0054918 | A1* | 2/2015 | Lee .................... H04N 13/254 348/46 |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2019/0043266 | A1* | 2/2019 | Venshtain .......... G06K 9/00281 |
| 2020/0379096 | A1* | 12/2020 | Zhou .................. G01S 7/497 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

ENHANCED TECHNIQUES FOR VOLUMETRIC STAGE MAPPING BASED ON CALIBRATION OBJECT

BACKGROUND

Field

The present disclosure relates to three-dimensional reconstruction and, more particularly, to enhanced three-dimensional reconstruction using a calibration object.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 100 is depicted. The user of an AR technology sees a real-world park-like setting 110 featuring people, trees, buildings in the background, and a concrete platform 120. The user also perceives that he/she "sees" "virtual content" such as a robot statue 130 standing upon the real-world platform 120, and a flying cartoon-like avatar character 140 which seems to be a personification of a bumble bee. These elements 130, 140 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

According to some embodiments, methods and systems for volumetric stage mapping based on one or more calibration objects are described. An example method may include obtaining a plurality of images of a calibration object, the images being obtained from a plurality of image sensors positioned about the calibration object, and the calibration object having location information associated with a volumetric capture surface on which the calibration object is located; generating, based on the images, a reconstructed object associated with the calibration object, the reconstructed object representing a three-dimensional representation of the calibration object; determining reconstruction quality information associated with the reconstructed object, wherein the determination is based on a ground-truth representation of the calibration object; and outputting the reconstruction quality information.

Another example method includes obtaining a plurality of reconstructed objects, each reconstructed object being a three-dimensional representation of a calibration object placed at a respective position of a plurality of positions on a stage, wherein image sensors are positioned about the stage; accessing a ground-truth representation of the calibration object; and determining, based on the reconstructed objects and the ground-truth representation, reconstruction quality information associated with the positions on the stage.

DETAILED DESCRIPTION

Figure 1:
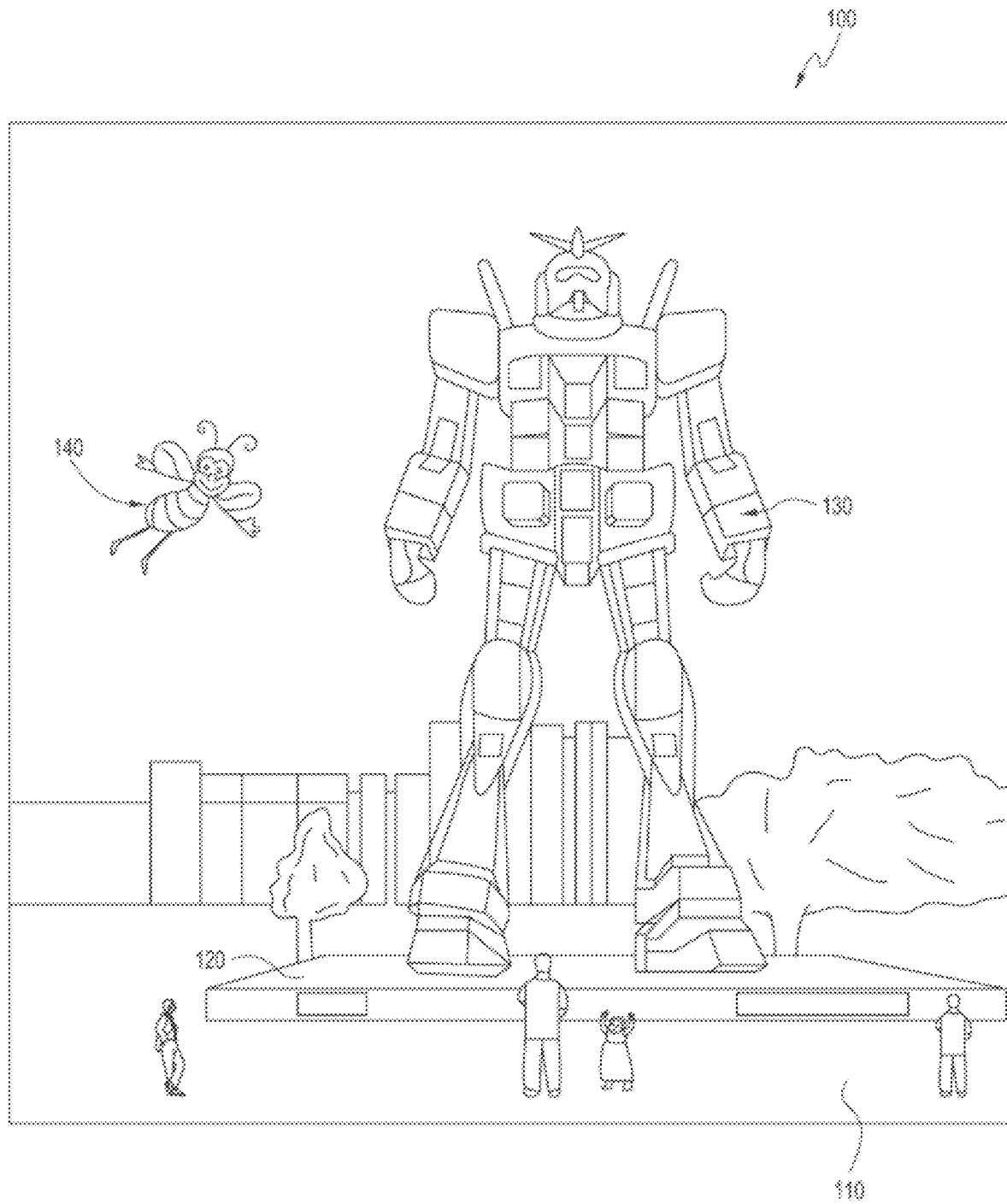
FIG. 1 illustrates a user's view of augmented reality (AR) through an AR device.

In virtual or augmented reality scenes, realism of the scenes may be enhanced via accurate representations of presented virtual objects. For example, an augmented reality scene may include a virtual object depicting a certain object known to a user. As an example, the virtual object may be a particular cup. Since the user may know the appearance of the cup, any deviation of the virtual object from the real-world cup may reduce realism of the augmented reality scene. As another example, AR scene 100 depicts a robot statue 130. It may be appreciated that the robot statue 130 may represent a particular robot which is known to a user. Thus, an accurate representation of the particular robot may improve a user experience of the AR scene 100.

This specification describes improved techniques to ensure accurate generation of three-dimensional representations of real-world objects. Example three-dimensional representations may include three-dimensional models, such as meshes, point clouds, and so on. A real-world object may include any object capable of being imaged by image sensors (e.g., cameras). For example, real-world objects may include persons, house-hold items, industrial items, and so on. Advantageously, the techniques described herein may allow for an accurate understanding of an accuracy associated with reconstructing a three-dimensional representation. For example, the techniques described herein may allow for an understanding of an expected accuracy and/or quality of a three-dimensional representation of a real-world object as compared to the real-world object itself.

Three-Dimensional Reconstruction of Object

An example technique to generate a three-dimensional representation of a real-world object may use a volumetric capture stage. An example volumetric capture stage may include a multitude of image sensors positioned about the stage. These image sensors may optionally be pointing at a same portion of the stage on which the real-world object is placed. Thus, the image sensors may obtain images of a real-world object placed within the volumetric capture stage. The obtained images may be analyzed to perform a three-dimensional reconstruction process. For example, photogrammetry techniques may be used. A resulting three-dimensional model of the real-world object may be generated based on this reconstruction process. For example, a point cloud may be generated. In this example, the point cloud may include a multitude of three-dimensional points which form a representation of the real-world object (e.g., a surface of the object). The three-dimensional points may have location information associated with a camera coordinate system or a real-world coordinate system. As another example, a mesh may be generated. In this example, the mesh may include a multitude of polygonal shapes which form the representation of the real-world object.

In some embodiments, the three-dimensional reconstruction process may include a correspondence matching process between obtained images of a real-world object. For example, a multitude of images may be obtained of a stationary real-world object. A system may identify points or features included in two or more images which are determined to correspond to a same portion of the real-world object. With respect to points, identified points may correspond to a same location in three-dimensional space. The respective images may provide different perspectives of the portion of the real-world object. Based on camera parameters described below, the system may determine three-dimensional coordinate information for the location (e.g., using photogrammetry techniques).

The image sensors described above may be calibrated to determine camera parameters. For example, intrinsic and extrinsic camera parameters may be obtained. Example intrinsic parameters may include focal length, image sensor format, principal point, and so on. Example extrinsic parameters may enable translation between real-world coordinates and camera coordinates, such as a location of a center of a camera, the camera's heading, and so on. Using this calibration information, a system may perform the correspondence matching process described above.

In this way, a user may place a real-world object on the volumetric capture stage, and a system may generate an associated three-dimensional representation. However, there may be inaccuracies introduced during generation of the three-dimensional representation. For example, inaccuracies may occur during the correspondence matching process. In this example, a system may inaccurately assign points in respective images as corresponding to a same location in three-dimensional space. Thus, the resulting three-dimensional representation may be less consistent with the real-world object. For example, lengths of portions of the representation may be inconsistent with lengths of corresponding portions of the real-world object.

At present, techniques to evaluate accuracy of a three-dimensional representation may be based on qualitative techniques instead of quantitative techniques. For example, a user (e.g., a designer) may review the resulting point cloud or mesh in comparison to a real-world object. In this example, the user may adjust the point cloud or mesh to more closely adhere to a visual look of a real-world object. Since the user may typically not have access to very precise measurements of the real-world object, it may be difficult to determine a deviation between the real-world object and the corresponding representation.

Inaccuracies may additionally relate to a placement of the real-world object on the volumetric capture stage. As may be appreciated, a central portion of the volumetric capture stage may enable a more accurate generation of a three-dimensional representation than a peripheral portion of the volumetric capture stage. For example, image sensors may be positioned about stage. Each of the image sensors may have a particular field of view of the stage. The central portion of the volumetric capture stage may correspond to an intersection of all, or a substantial portion, of the field of views of the image sensors. This high level of intersection may allow for an accurate reconstruction of the real-world object into a three-dimensional representation.

In contrast, a portion of the volumetric stage proximate to an extremity may have reduced accuracy when compared to a central portion of the volume capture stage. For example, an image sensor closest to a real-world object at the extremity may have limited visibility of the real-world object. Other image sensors may be able to image the real-world object; however, they may be positioned further from the object as compared to the central portion. Due to this distance, their ability to resolve fine details on the real-world object may be reduced. The resulting three-dimensional representation may therefore be less accurate at this extremity.

Furthermore, it may be appreciated that a lens on an image sensor may have optical aberrations which can reduce an accuracy of a three-dimensional representation. As an example, there may be monochromatic aberrations and/or chromatic aberrations. With respect to monochromatic aberrations, a lens may have reduced accuracy outside of a central portion of the lens. For example, a sharpness of the lens may be reduced at the corners as compared to the central portion for a given f-stop of the lens. Additionally, a lens may cause differing levels of distortion to be depicted in differing areas of an image. For example, barrel or pincushion distortion may be evident in a portion of an image while less evident in a different portion of the image. With respect to chromatic aberration, errors may be introduced depending on colors or wavelengths of received light.

While, at least, some of the identified errors may be fixed using software techniques (e.g., barrel distortion may be addressed), certain errors may persist during a reconstruction process based on obtained images. Thus, an accuracy of a resulting three-dimensional representation may be reduced.

Calibration Object

As will be described below, a calibration object (e.g., a real-world object) may be used to precisely map expected reconstruction accuracies throughout a volume of space (e.g., a volumetric capture stage). The calibration object may comprise different features, including example two-dimensional features (e.g., a flat section) and example three-dimensional features (e.g., cylindrical shapes, dowels, and so on). These features may be of varying sizes, angles, positions, and so on, in the calibration object. Additionally, the features may be of varying texture, reflectivity, and so on. Advantageously, the calibration object may be precisely mapped to determine a ground-truth representation of the calibration object. As described herein, the ground-truth representation may be a dense point cloud or mesh obtained of the calibration object. For example, the ground-truth representation may be generated via a dense scan of the calibration object using one or more of images sensors, time-of-flight sensors (e.g., laser range sensors, such as LiDAR), and so on. Using this ground-truth representation, quantitative comparisons may be performed between the ground-truth representation and three-dimensional representations generated from images of the calibration object on the volumetric capture stage. In this way, a reconstruction quality associated with a generated three-dimensional representation may be determined.

To determine expected qualities of reconstruction throughout the stage, the calibration object may be moved about the stage. For example, the calibration object may be positioned on the volumetric calibration stage at a first position. At this first position, image sensors positioned about the stage may obtain images of the calibration object. A system, such as the reconstruction quality system 400 described herein, may generate a three-dimensional representation of the calibration object (referred to herein as a 'reconstructed object') based on the images. To quantitatively determine a quality of the reconstructed object, the system may then compare the reconstructed object to the ground-truth representation. As will be described, reconstruction quality information may be determined by the system based on the comparison. Example reconstruction quality information may include measures associated with differences between the ground-truth representation and the reconstructed object. For example, differences in size, length, texture, and so on, between the reconstructed object and ground-truth representation may be determined.

Subsequently, the calibration object may be moved to a second position. For example, the second position may be a threshold distance from the first position. In some embodiments, the calibration object may be raised, or lowered, from a height associated with the first position. As an example, the calibration object may be attached to a tripod, or other positioning device, to hold the calibration object. In this example, a height of the calibration object may be adjusted via the tripod. Additionally or alternatively, in some embodiments, the calibration object may be rotated via a particular angle. For example, the calibration object may be rotated about one or more axes via manipulation of a tripod or other positioning device.

The calibration object may thus be moved about the volumetric capture stage to a multitude of positions. At each position of the calibration object, reconstruction quality information may be determined by the system for a corresponding reconstructed object. In this way, expected reconstruction accuracies may be determined for any position on the volumetric capture stage. In some embodiments, the system may generate information usable for inclusion in an interactive user interface. Example information may include a graphical representation of an accuracy associated with a reconstructed object. The graphical representation may assign a color, such as a color included in a spectrum, which represents an accuracy for different portions of the reconstructed object. Thus, if a first portion of the reconstructed object (e.g., a dowel of a first length and/or radius) closely adheres to the ground-truth representation, the graphical representation may be assigned a first color (e.g., green). In contrast, if a second portion of the reconstructed object (e.g., a dowel of a shorter length and/or smaller radius) less closely adheres to the ground-truth representation, the graphical representation may be assigned a second color (e.g., red). Additional examples of reconstruction quality information will be described in more detail below.

Thus, a user may leverage the determined reconstruction quality information when placing real-world objects onto the volumetric capture stage. For example, the user may identify that certain positions on the volumetric capture stage result in reconstructed objects with unacceptable quality. In some embodiments, the user may improve the unacceptable quality by moving a real-world object to a different position. Additionally or alternatively, the user may also place one or more additional image sensors with a field of view corresponding to these certain positions. The additional image sensors may allow for a greater accuracy of reconstruction to be achieved.

While adding image sensors may improve upon a quality of reconstruction, these additional image sensors may provide for a more complex volumetric capture stage. For example, the image sensors will need to be synchronized to obtain an image at substantially a similar time. As another example, a greater number of image sensors may increase an amount of data being transferred. Similarly, the increased amount of data may require more computational resources.

In some embodiments, therefore, a user may cause an updating of a reconstruction algorithm or process based on the reconstruction quality information instead of adding image sensors. As an example, the reconstruction algorithm or process may be adjusted to improve upon one or more measures associated with differences between the ground-truth representation and reconstructed object.

In this way, a user may obtain an understanding of different reconstruction accuracies achievable using a volumetric capture stage.

Reference will now be made to the drawings, in which like reference numerals refer to like parts throughout. Unless indicated otherwise, the drawings are schematic and not necessarily drawn to scale.

Figure 2:
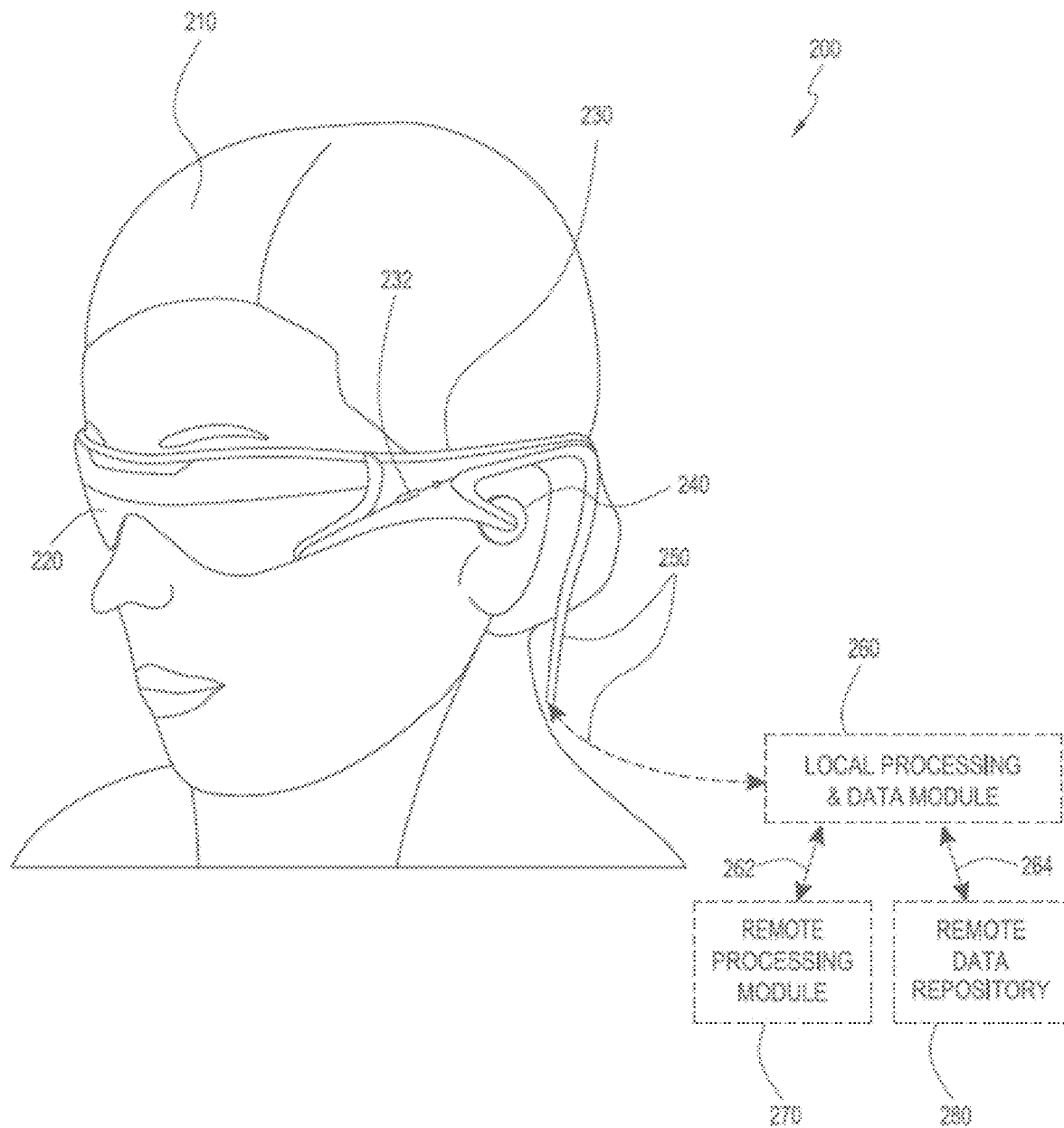
FIG. 2 illustrates a display system for simulating three-dimensional imagery for a user.

FIG. 2 illustrates an example of wearable system 200 which can be configured to provide an AR/VR/MR scene. The wearable system 200 can also be referred to as the AR system 200 or the wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The wearable system 200 can perform voice or speech recognition on the audio stream.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

Determining Reconstruction Accuracies for Volumetric Capture Stage

As described above, an accurate three-dimensional representation of a real-world object may enhance a realism associated with an AR/VR scene. For example, a real-world object may represent an actor. This actor may be recognizable, such that any differences between a three-dimensional representation of the actor and the real-world actor may reduce a user experience of the scene. At present, however, there are limited techniques to quantitatively measure an expected quality or accuracy associated with the three-dimensional representation.

With respect to the example above, a volumetric capture stage may be used to generate the three-dimensional representation of the actor. An example volumetric capture stage may include a multitude of image sensors positioned about the volumetric capture stage. In some embodiments, at least a portion of the image sensors may be stereoscopic image sensors. Images may be obtained of the actor at a same, or substantially similar, time. Since the images depict different perspectives of the actor, a system may generate a point cloud or mesh which forms the three-dimensional representation. The resulting three-dimensional representation may include inaccuracies as compared to the actor. For example, certain facial features may be slightly differently sized, may be positioned differently, may be slightly askew, and so on. These differences may be perceptible to a user, such that a realism associated with an AR/VR scene may be reduced.

In an effort to understand expected reconstruction accuracies when using a volumetric capture stage, a calibration object may be used. An example calibration object may include different features, such as two-dimensional features (e.g., a flat surface), three-dimensional features (e.g., dowels of varying lengths, radii, and so on), differing textures, different colors, and so on. The calibration object may be precisely mapped to obtain a ground-truth representation. For example, a dense scan may be obtained of the calibration object. Thus, the ground-truth representation may be a dense point cloud depicting the different features described above. In this way, precise measurements of the calibration object may be stored in the ground-truth representation. As will be described below, the calibration object may be moved about the volumetric capture stage. Reconstructed objects may be generated based on images of the calibration object at difference positions on the stage. To determine a reconstruction accuracy, differences between a reconstructed object and the ground-truth representation may be determined. In this way, different positions on the volumetric capture stage may be determined to have different reconstruction accuracies.

For example, it may be determined that a certain position on the volumetric capture stage allows for accurately reconstructing features of greater than a certain dimension (e.g., length or radius). With respect to a dowel, in this example it may be determined that a dowel less than the certain radius will not be accurately reflected in a reconstrued object at the certain position. For example, the dowel may be represented in the reconstructed object as an incorrect size. As described herein, reconstruction quality information may be generated to represent respective accuracies or qualities associated with one or more reconstructed objects.

Example reconstruction quality information may indicate deviations between points included in a reconstructed object and points included in a ground-truth representation. For this example quality information, the reconstructed object may be a point cloud. A system may therefore determine differences in three-dimensional positions between points of the reconstructed object and points of the ground-truth representation. Example reconstruction quality information may also indicate a quality score associated with a reconstructed object. For example, the quality score may indicate an overall score determined based on differences between the reconstructed object and ground-truth representation. In some embodiments, a quality score may be specific to a specific feature of the calibration object. Thus, there may be a multitude of quality scores corresponding to the different features.

Figure 3A:
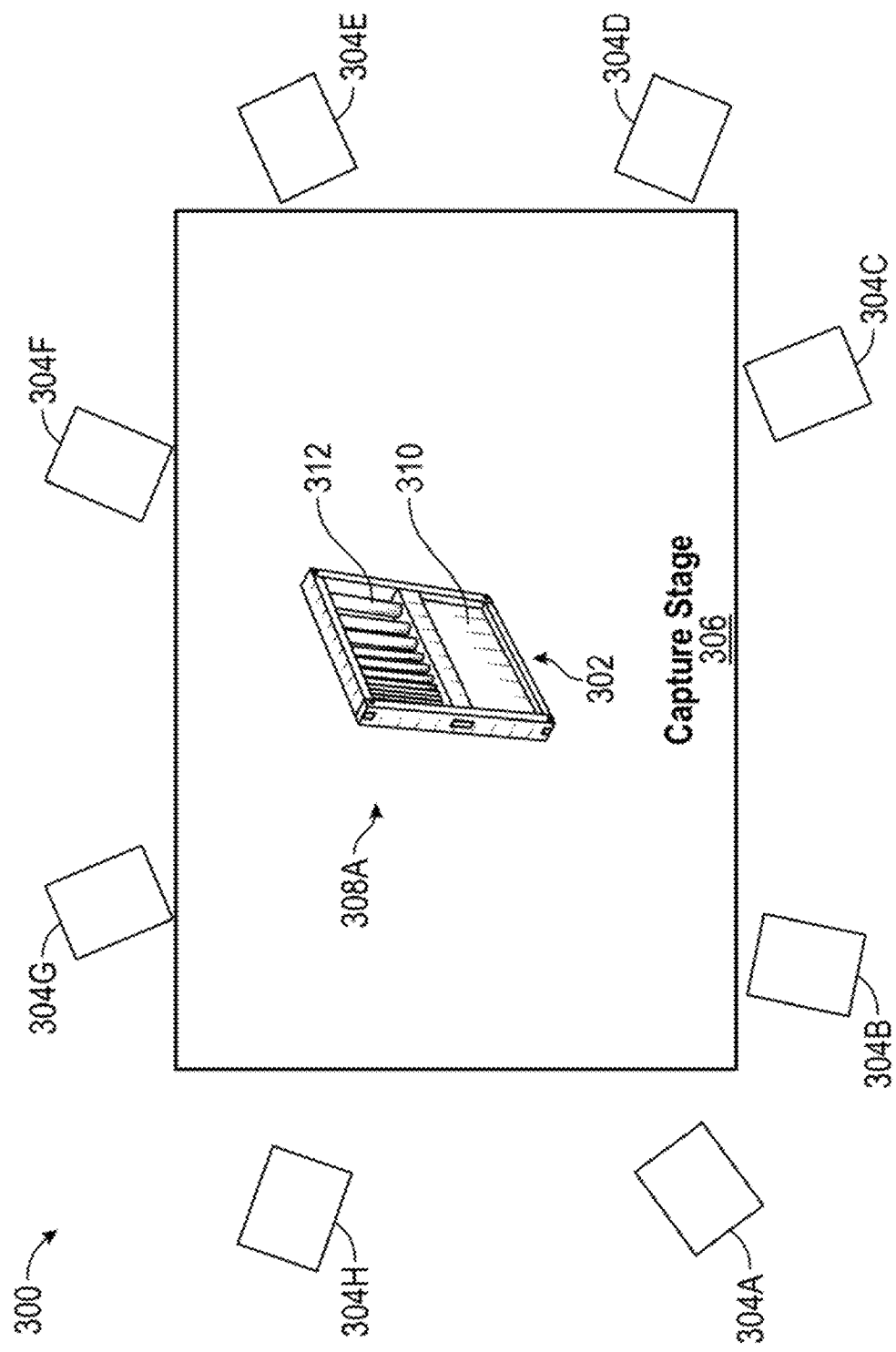
FIG. 3A illustrates a calibration object in a first position on a volumetric stage.

FIG. 3A illustrates a calibration object 302 in a first position 308A on a volumetric capture stage 306. In the illustrated example, image sensors 304A-304H are positioned about the volumetric capture stage 306. In some embodiments, one or more of the image sensors 304A-304H may be stereoscopic cameras. In some embodiments, the image sensors 304A-304H may represent cameras with lenses of varying focal lengths. In some embodiments, the image sensors 304A-304H may represent cameras with lenses of a same focal length.

In some embodiments, the first position 308A (e.g., position A) may indicate location information associated with the volumetric capture stage 306. For example, the first position 308A may indicate a two-dimensional location on a surface of the stage 306 (e.g., an X and Y coordinate). The two-dimensional location may optionally correspond to a centroid of the calibration object 302. In some embodiments, the two-dimensional location may correspond to a position of a same portion of the calibration object 302 as projected onto the surface of the stage 306. For example, a portion of the calibration object 302 may face downward toward the surface of the stage 306. In this example, a center portion of the object 302 may be assigned as corresponding to the two-dimensional location of the calibration object 302. As will be described, in some embodiments, the calibration object 302 may be rotated. Thus, in some embodiments, the location information may indicate a two-dimensional location associated with the object 302 along with a measure of rotation about one or more axes.

In some embodiments, the first position 308A may indicate a three-dimensional location. For example, the three-dimensional location may comprise x and y values, where the x and y values correspond to a surface of the volumetric capture stage 306. As an example, the three-dimensional location may indicate a portion of the surface of the stage 306 which the calibration object 302 is above. In this way, a precise area of the stage may be determined. The three-dimensional location may additionally indicate height information associated with the calibration object 302. For example, the three-dimensional location information may indicate three-dimensional coordinates associated with the object 302. Example three-dimensional coordinates may represent a volume of space associated with the object 302. Other coordinate system origins and mappings may be used.

The illustrated calibration object 302 includes a multitude of different features. For example, one or more first features 310 may be two-dimensional features. In this example, the two-dimensional features may represent a substantially flat shape (e.g., a rectangle). Other two-dimensional features may be used and fall within the scope of the disclosure herein. For example, different polygons, which may be substantially planar, may be included on the calibration object 302. One or more second features 312 may be three-dimensional features. Example three-dimensional features may include different three-dimensional shapes (e.g., cylinders, spheres, cubes, and so on). FIG. 3A illustrates the second features 312 as being cylinders, such as dowels. These cylinders may be of varying sizes and/or varying radii. For example, a left-most cylinder has a smaller radius than a right-most cylinder. The calibration object 302 may optionally include varying textures. For example, one of the cylinders may be made of wood with a certain texture. As another example, one of the cylinders may be ceramic and have a different texture. As another example, a material (e.g., cloth, felt, leather, and so on) may be wrapped around one of the cylinders. In some embodiments, materials of different reflectivity may be used.

In some embodiments, a preferred calibration object 302 may be created using wood. For example, the two-dimensional features 310 and three-dimensional features 312 may be created from wood as a material. Wood may allow for certain advantageous properties. As an example, wood may be easily paintable. As will be described, different paint colors may be applied to different faces, or portions, of the calibration object 302. This may aid in the easy, and rapid, identification of pose. Wood may also be substantially diffuse; such that specular reflections may be reduced. Additionally, wood may allow for easy discretization of the different features 310-312. For example, a wooden dowel may be used to represent a cylinder. In this example, the wooden dowel may be configured for insertion into, and removal from, the calibration object 302. Therefore, features of the calibration object 302 may easily be changed.

The calibration object 302 may be placed at the first position 308A using a positioning device. For example, a tripod may be used to hold the calibration object 302 substantially still. As another example, the calibration object 302 may include a lower portion which functions as a stand. Thus, the stand may rest on a surface of the volumetric capture stage 306. In some embodiments, a person may hold the calibration object 302. As will be described, images may be obtained of the calibration object 302 at a substantially same time. Thus, images may freeze any movement of the calibration object 302 due to the holding.

The image sensors 304A-304H may, at a substantially same time, be triggered to obtain images of the calibration object 302. For example, the images may be obtained within a threshold amount of time. As will be described below, with respect to FIG. 4, a system described herein may generate a reconstructed object based on the images. The reconstructed object may then be compared with a ground-truth representation of the calibration object 302. As described herein, the ground-truth representation may represent a dense scan, or highly detailed mesh, of the calibration object 302. Thus, the ground-truth representation may precisely depict the different features 310-312 of the calibration object 302. Any deviations of the reconstructed object from the ground-truth representation may be determined by the system.

In some embodiments, an unmanned vehicle (e.g., an unmanned ground vehicle) may control the position of the calibration object 302. For example, a lower portion of the calibration object 302 may be inserted into the unmanned vehicle. As another example, the unmanned vehicle may have a tripod, or positioning device, extending from a top of the unmanned vehicle. The calibration object 302 may therefore be placed at the first position 308A via movement of the unmanned vehicle. As will be described, the calibration object 302 may be moved to different positions on the volumetric capture stage 306. Thus, in some embodiments the techniques described herein may be automated. For example, the unmanned vehicle may move the object 302 about the stage 306 to different positions. Images may be obtained of the calibration object 302 at the different positions and reconstructed objects generated. These reconstructed objects may then be analyzed to determine accuracies or qualities of the objects. In this way, the techniques described herein may be automated. Thus, a volumetric capture stage may be quickly analyzed without substantial user involvement.

Figure 3B:
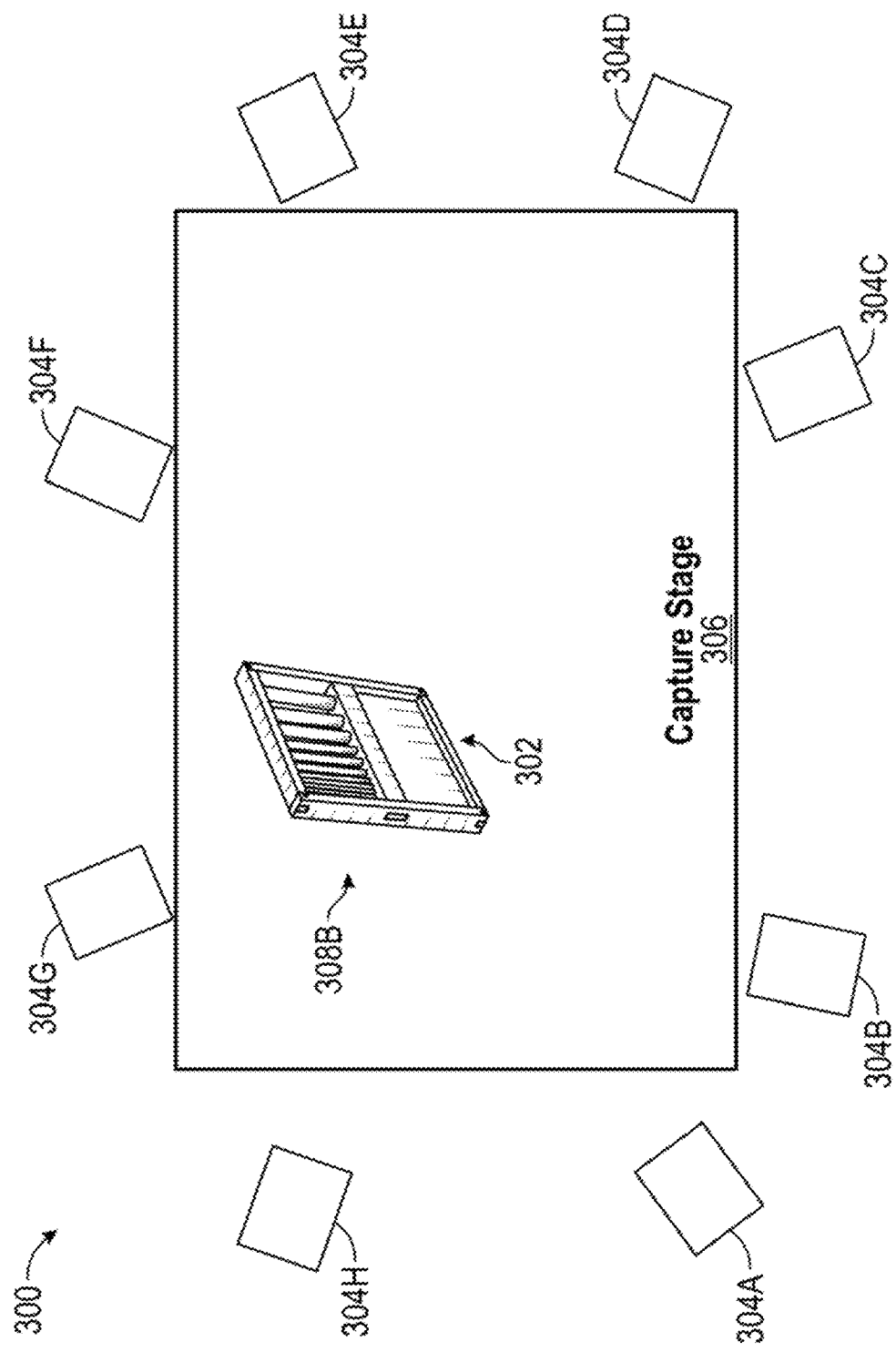
FIG. 3B illustrates the calibration object in a second position on the volumetric stage.

FIG. 3B illustrates the calibration object 302 in a second position 308B on the volumetric capture stage 306. As described above, different positions on the volumetric capture stage 306 may allow for different reconstruction accuracies. For example, at the second position 308B the calibration object is at a less central portion of the stage 306 than the first position 308A. For example, image sensors 304G-304H are closer to the object 302 while other sensors (e.g., sensors 304C-304E) are positioned further from the object 302. Thus, a portion of the object 302 facing these other sensors may be captured in images at less detail.

Similar to the description of FIG. 3A, the image sensors 304A-304H may be triggered to obtain images of the calibration object 302. These images may then be provided to a system described herein, and a resulting reconstructed object generated for the second position 308B.

Figure 3C:
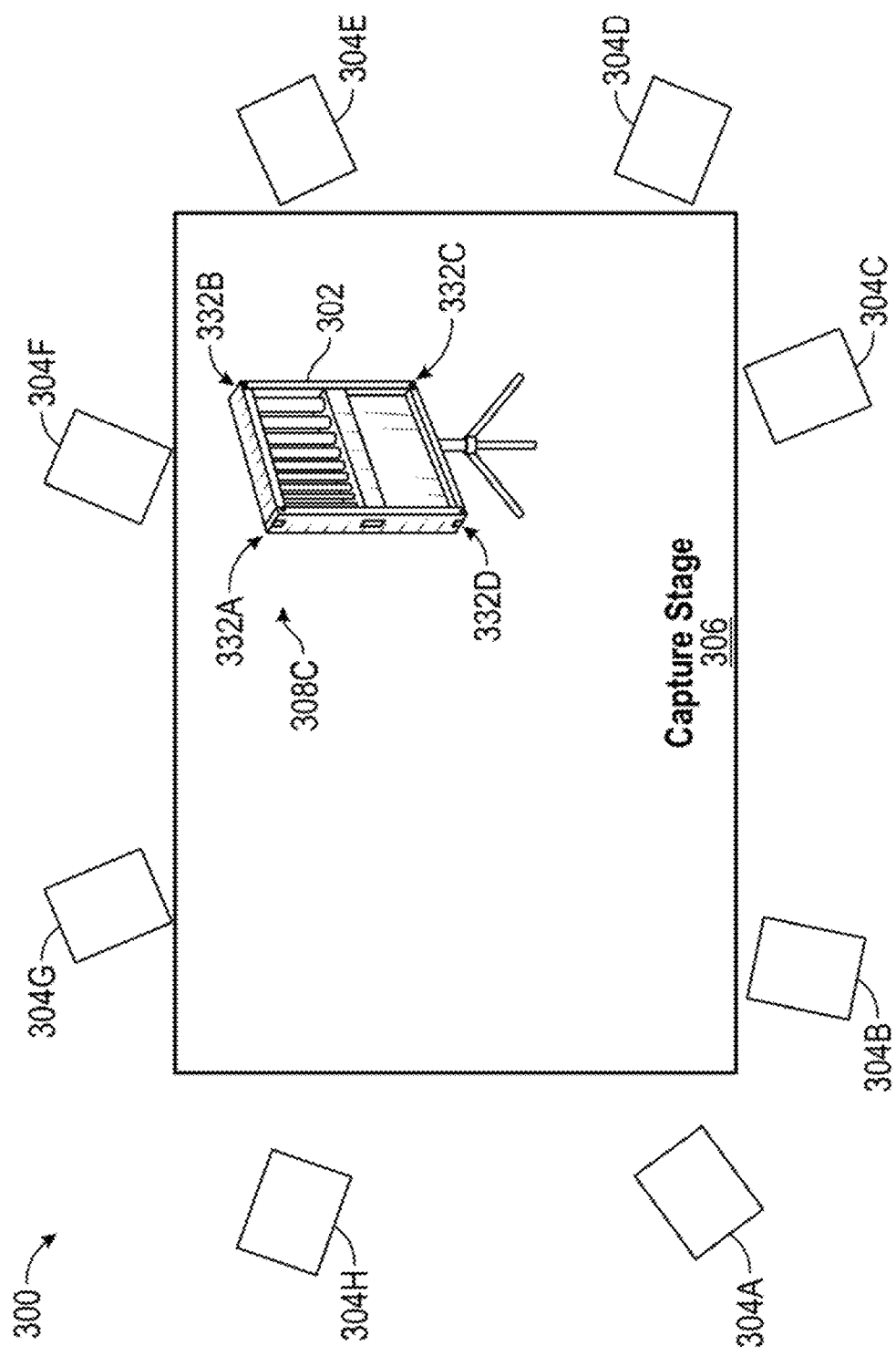
FIG. 3C illustrates the calibration object in a third position on the volumetric stage.

FIG. 3C illustrates the calibration object 302 in a third position 308C on the volumetric stage 306. As described above, in some embodiments a positioning device 330 may be used to control position of the calibration object 302. In some embodiments, the positioning device 330 may be a tripod. Using this device 330, the calibration object 302 may be rotated about one or more axes. As illustrated, the calibration object 302 is at the third position 308C rotated by an angle (e.g., 'Angle A') about an axis. Adjusting an angle may add an additional variation to enhance an understanding of capabilities of the volumetric capture stage 306. For example, it may be determined that certain rotations at certain positions result in reduced accuracy for reconstructed object.

While a positioning device 330 is illustrated in FIG. 3C, it may be appreciated that a user may hold the calibration object 302 at a certain angle. In some embodiments, aruco or charuco markers may be placed on the calibration object and used to determine a pose. In some embodiments, positions of the corners (e.g., corners 332A-332D) may be identified from images obtained by the image sensors 304A-304H. Based on three-dimensional positions of the corners, rotation information may be determined.

Figure 3D:
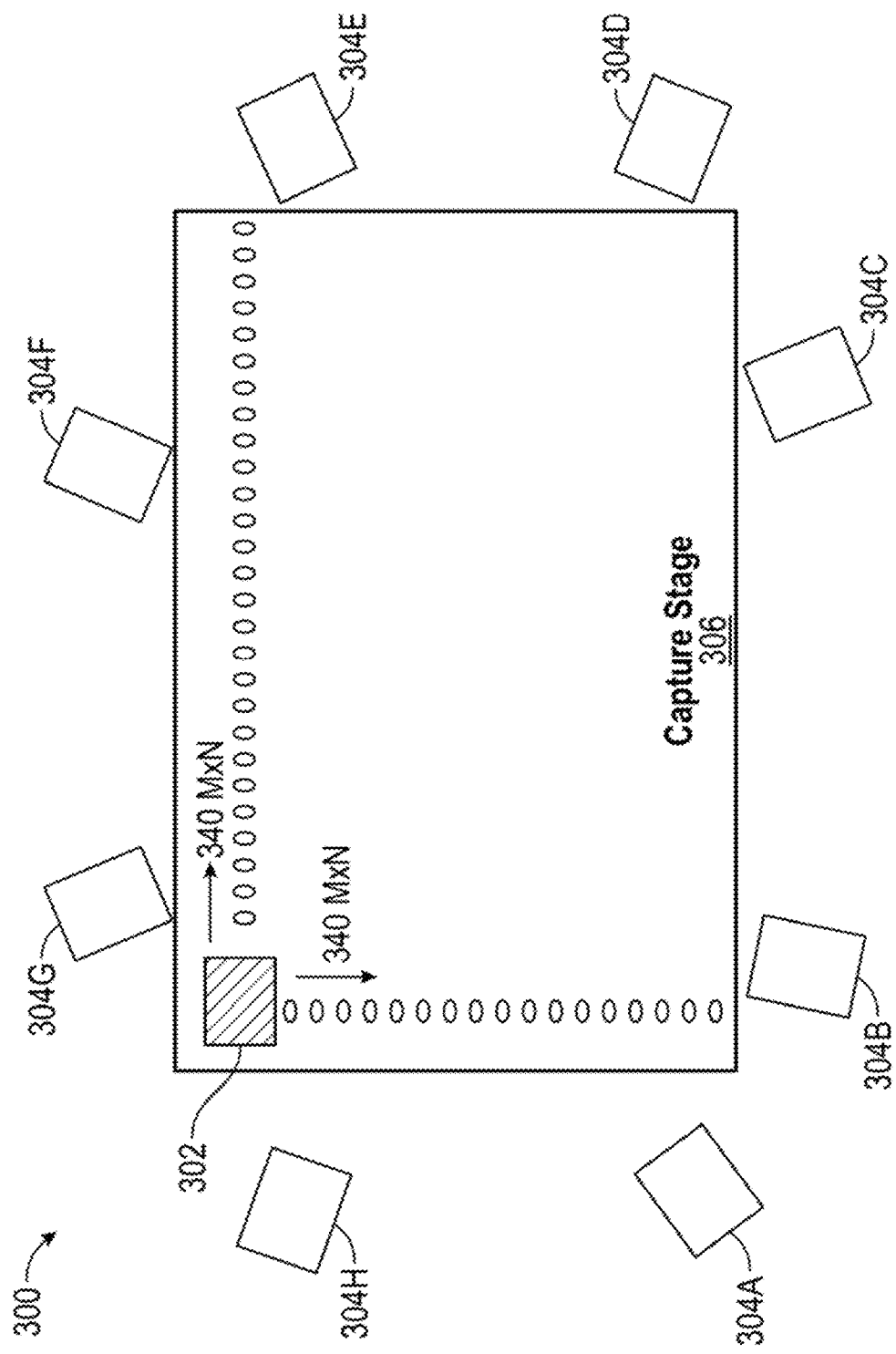
FIG. 3D illustrates the calibration object and example positions on the volumetric stage.

FIG. 3D illustrates the calibration object 302 and example positions 340 on the volumetric capture stage 306. In some embodiments, the calibration object 302 may be moved to discrete positions on the volumetric capture stage 306. For example, the calibration object 302 may be moved by a threshold distance (e.g., one inch, 6 inches, and so on) along one or more axes of the volumetric capture stage 306. At each position, the image sensors 304A-304H may be triggered to obtain images of the calibration object 302. Similar to the description of FIG. 3C above, an angle of the object 302 about one or more axes may be adjusted. Thus, at each of the positions 340, the calibration object 302 may be imaged at varying angles.

As illustrated, the example positions 340 cause the calibration object 302 to be moved by a threshold distance along a first axis (e.g., the X-axis). The calibration object 302 may then be moved a threshold distance along a second axis (e.g., the Y-axis), and then moved along the first axis. The calibration object 302 may therefore traverse the volumetric capture stage 306. In this way, a detailed understanding of reconstruction accuracies or qualities may be determined for the volumetric capture stage 306.

Figure 4:
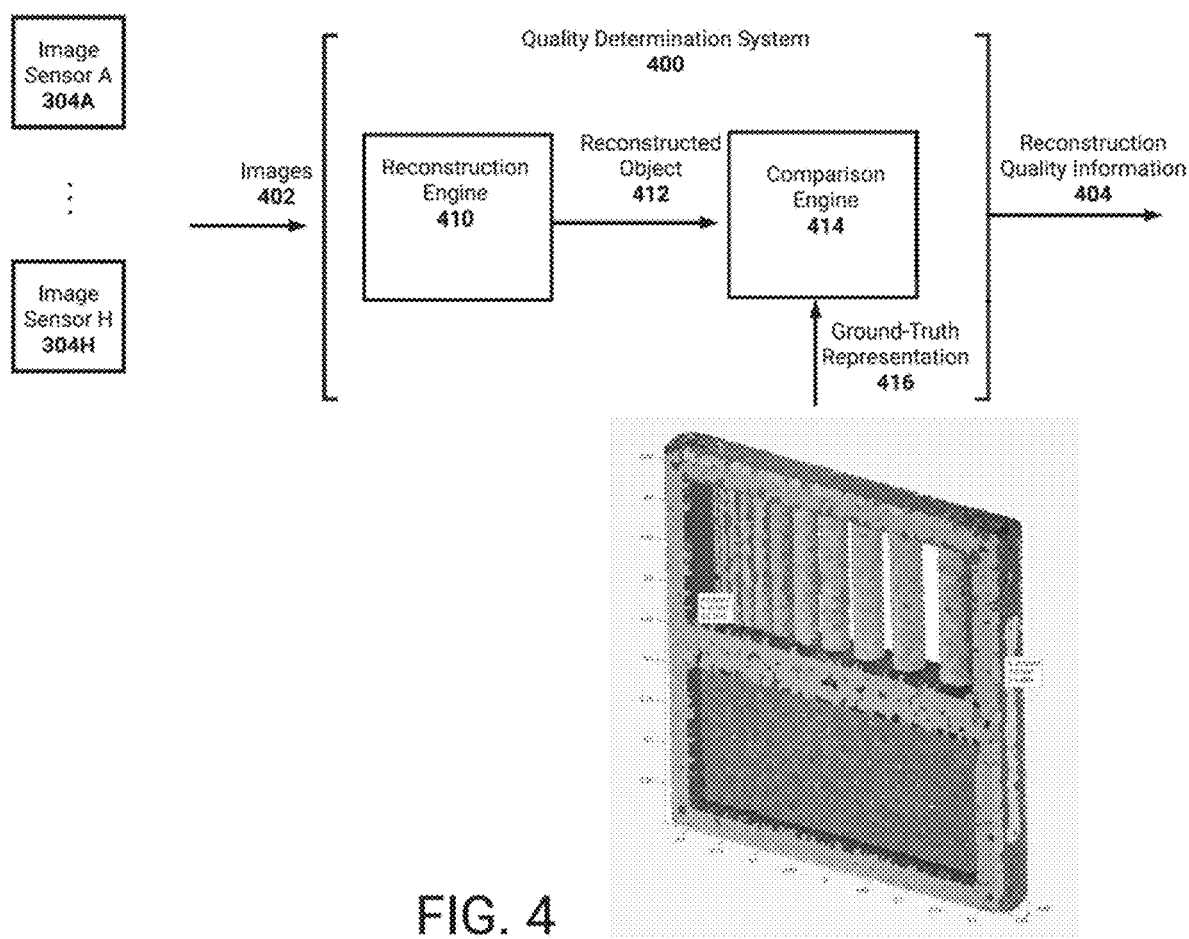
FIG. 4 illustrates a block diagram of an example quality determination system determining reconstruction quality information.

FIG. 4 illustrates a block diagram of an example quality determination system 400 determining reconstruction quality information 404. The quality determination system 400 may represent a system of one or more computers, one or more virtual machines executing on a system of one or more computers, and so on. As illustrated, the quality determination system 400 may receive images 402 and generate the reconstruction quality information 404. As described in FIGS. 3A-3D, the images 304 may represent images obtained of a calibration object at different positions on a volumetric capture stage.

The quality determination system 400 includes a reconstruction engine 410 usable to generate a reconstructed object 412 based on the images 402. The reconstruction engine 410 may use example reconstruction techniques, such as photogrammetry, to analyze the images 402. As described above, the images 402 may represent different perspectives of the calibration object as captured by image sensors 304A-304H at a substantially same point in time. The image sensors 304A-304H may be calibrated, such that extrinsic and intrinsic camera parameters may be accessed by the reconstruction engine 410. Using the images 402, and camera parameters, the reconstruction engine 410 may thus determine a reconstructed object 412 representing a point cloud or mesh associated with the calibration object.

The quality determination system 400 may associate position information with the reconstructed object 412. For example, as described above the images 402 may be obtained of the calibration object while at a certain position and/or angle about one or more axes. Thus, the quality determination system 400 may store this position information for use in analyzing the volumetric capture stage.

The quality determination system 400 further includes a comparison engine 414. The comparison engine 414 can determine a reconstruction accuracy or quality associated with the reconstructed object 412. A ground-truth representation 416 of the calibration object may be accessed to effectuate this determination. As illustrated, the ground-truth representation 416 may represent a dense scan (e.g., a dense point cloud) obtained from the calibration object. For example, the ground-truth representation 416 may be a highly accurate detailed scan of the calibration object. As may be appreciated, the volumetric capture stage may represent a less dense version of a scan. Since the volumetric capture stage may be designed for use with a wide variety of real-world objects, for example of different sizes, the stage may include image sensors fixed at certain positions about the stage. Additionally, the volumetric capture stage may not include range sensors (e.g., LiDAR). Thus, it may be impractical to effectuate a dense scan for the wide variety of real-world objects capable of being imported into an AR/VR scene.

The ground-truth representation 416 may therefore precisely capture details of the calibration object. For example, precise measurements associated with different two-dimensional and three-dimensional features may be captured in the ground-truth representation. In implementations in which the ground-truth representation 416 is a point cloud, the points of the point cloud may precisely map to a contour of the calibration object. In some embodiments, the ground-truth representation 416 may represent a precise computer-aided design (CAD) model. This CAD model may then be built using a precise technique, such as a precise three-dimensional printer.

The comparison engine 414 may therefore analyze the reconstructed object 412 with the ground-truth representation 416. For example, the comparison engine 414 may analyze each point of a point cloud which forms the reconstructed object 412. Each point of the point cloud may be compared with points of the ground-truth representation 416. For example, a closest point of the ground-truth representation 416 may be identified for each point of the reconstructed object 412. The comparison engine 414 may then determine a difference in three-dimensional location between the points. This difference may represent an error per point associated with the reconstructed object 412.

The comparison engine 414 may optionally generate a data structure (e.g., a vector) indicating differences between three-dimensional locations of points in the reconstructed object 412 and points in the ground-truth representation 416. For example, a measure of central tendency associated with the differences may be determined. As another example, statistical information (e.g., a variance) associated with the differences may be determined.

The comparison engine 414 may also determine information for different features or portions of the calibration object. As an example, the comparison engine 414 may determine an extent to which each feature of the calibration object differs between the reconstructed object 412 and the ground-truth representation 416. Example differences may relate to an error per point of a feature, a difference in dimensions (e.g., length, width, radius), and so on. Thus, the comparison engine 414 may determine where the reconstruction engine 410 fails. For example, the engine 414 may determine a minimum radius of a feature which the reconstruction engine 410 can reconstruct with greater than a threshold accuracy. In this example, the comparison engine 414 may indicate that dowels with less than a threshold radius are represented inaccurately in the reconstructed object 412. As an example, an average error associated with locations of points forming the feature in a point cloud of the reconstructed object 412, as compared to corresponding points in the ground-truth representation 416, may be greater than a threshold.

In some embodiments, the comparison engine 414 may generate information usable for inclusion in an interactive user interface. With respect to the reconstructed object 412 being a point cloud, each point of the point cloud may be optionally assigned an accuracy value within a range of values. An interactive user interface may be presented on a user device and may assign a color to each point based on the associated accuracy value. For example, the point cloud may be assigned variations of red and green based on respective accuracy values. In this way, a user of the user interface may rapidly identify which portions of the calibration object were accurately reconstructed in the reconstructed object 412.

Similarly, the comparison engine 414 may compare a multitude of reconstructed objects with the ground-truth representation. Each of the reconstructed objects may represent the calibration object at a particular position and/or rotation. In some embodiments, an interactive user interface may be generated which allows a user to quickly view accuracies of the reconstructed objects. For example, a slider may be included in the user interface. The user may adjust a position of the slider to scroll through each reconstructed object. As described above, points of each reconstructed object may be assigned a color. Thus, the user may quickly scroll through each reconstructed object to ascertain which positions on the calibration surface result in a reconstructed object formed from green points. In some embodiments, a graphical representation of the volumetric capture stage may be presented. When scrolling through the reconstructed objects, the graphical representation may update to reflect a position and/or angle associated with a presently viewed reconstructed object.

In the illustrated example, the quality determination system 400 outputs reconstruction quality information 404. This information 404 may include the information determined by the comparison engine 414 described above and may be provided to a user device, or other system, for use in analyzing the volumetric capture stage. In some embodiments, the reconstruction quality information 404 may be provided to the reconstruction engine 410 to adjust an algorithm or process associated with generating reconstructed objects 412. For example, the reconstruction quality information 404 may indicate an error per point of a point cloud. The reconstruction engine 410 may update weights of a neural network, fine-tune variables of a reconstruction algorithm, and so on, based on the errors.

Example Flowcharts

Figure 5A:
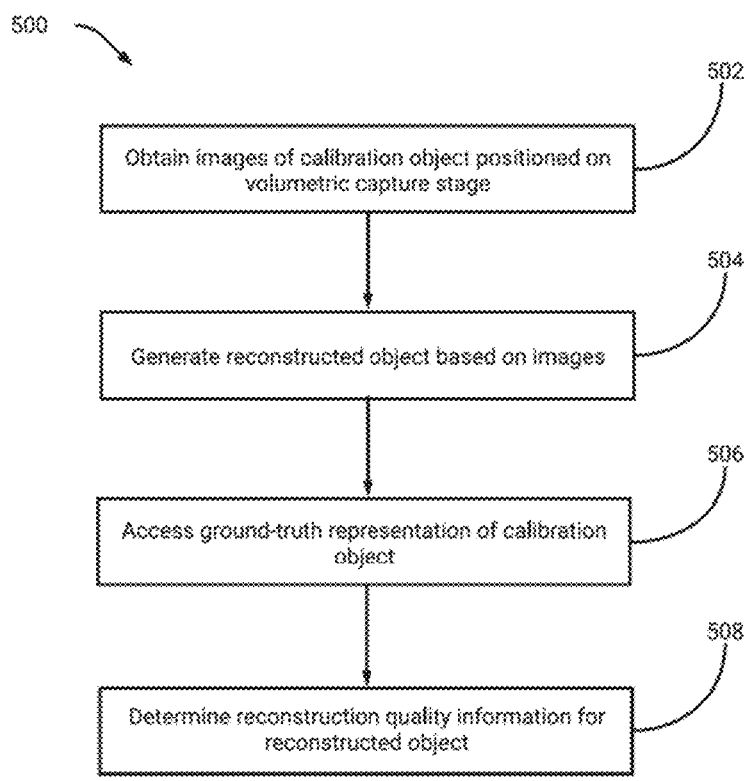
FIG. 5A illustrates a flowchart of an example process to determine reconstruction quality information for a reconstructed object.

FIG. 5A illustrates a flowchart of an example process 500 to determine reconstruction quality information. For convenience, the process 500 will be described as being performed by a system of one or more computers. For example, the system may be the quality determination system 400 described in FIG. 4.

At block 502, the system obtains images of a calibration object positioned on a volumetric capture stage. The images may be obtained from image sensors positioned about the volumetric capture stage. For example, the images may enable a three-hundred sixty degree view of the calibration object.

As described in FIGS. 3A-3D, the calibration object may be formed from disparate features. For example, some or all of the features may be two-dimensional (e.g., substantially planar) features. Additionally or alternatively, some or all of the features may be three-dimensional features. Example three-dimensional features may be formed from cylinders, spheres, cubes, and so on. Three-dimensional features may also be arbitrary three-dimensional shapes. For example, a three-dimensional object may be included on the calibration object (e.g., an irregularly or oddly shaped object). These features may be of varying textures and colors. For example, fine texture variations may be formed from use of cloth, felt, leather, and so on.

Advantageously, the features may be of varying sizes. For example, the calibration object may include different cylinders of varying lengths and/or radii. As another example, the calibration object may include spheres of decreasing radius. As another example, there may be a multitude of different substantially planar rectangles of varying dimensions. In this way, the calibration object may include varying levels of detail.

At block 504, the system generates a reconstructed object based on the images. The system may access camera parameters for the image sensors, such as extrinsic and intrinsic parameters. The system may then use example techniques, such as photogrammetry, to generate a reconstructed object. For example, a point cloud representing three-dimensional locations of points on a surface of the calibration object may be determined. As another example, a mesh representing polygonal shapes representing the surface of the calibration object may be determined.

At block 506, the system accesses a ground-truth representation of the calibration object. As described in FIG. 4, the ground-truth representation may represent a dense scan, or a highly detailed mesh, of the calibration object. This ground-truth representation may thus have been previously generated and stored for access by the system.

At block 508, the system determines reconstruction quality information for the reconstructed object. For example, the system may compare the reconstructed object to the ground-truth representation. To ensure a consistent comparison, the system may rotate, and/or apply a transformation to, the reconstructed object or ground-truth representation to cause a same orientation (e.g., pose) to be compared.

For example, the calibration object may be painted with different colors. In this example, different faces of the calibration object may be painted different colors (e.g., a front may be red while a back may be blue). The system may identify the colors in the reconstructed object. Thus, the system may ensure a consistent orientation of the reconstructed object is maintained with respect to the ground-truth representation. As an example, the system may ensure that the same colored faces are compared between the reconstructed object and the ground-truth representation. The system may additionally identify corners of the reconstructed object which match with corners of the ground-truth representation. For example, the system may identify a certain corner as depicted in each of the obtained images. Based on these identifications, the system may determine a pose of the reconstructed object.

Figure 5B:
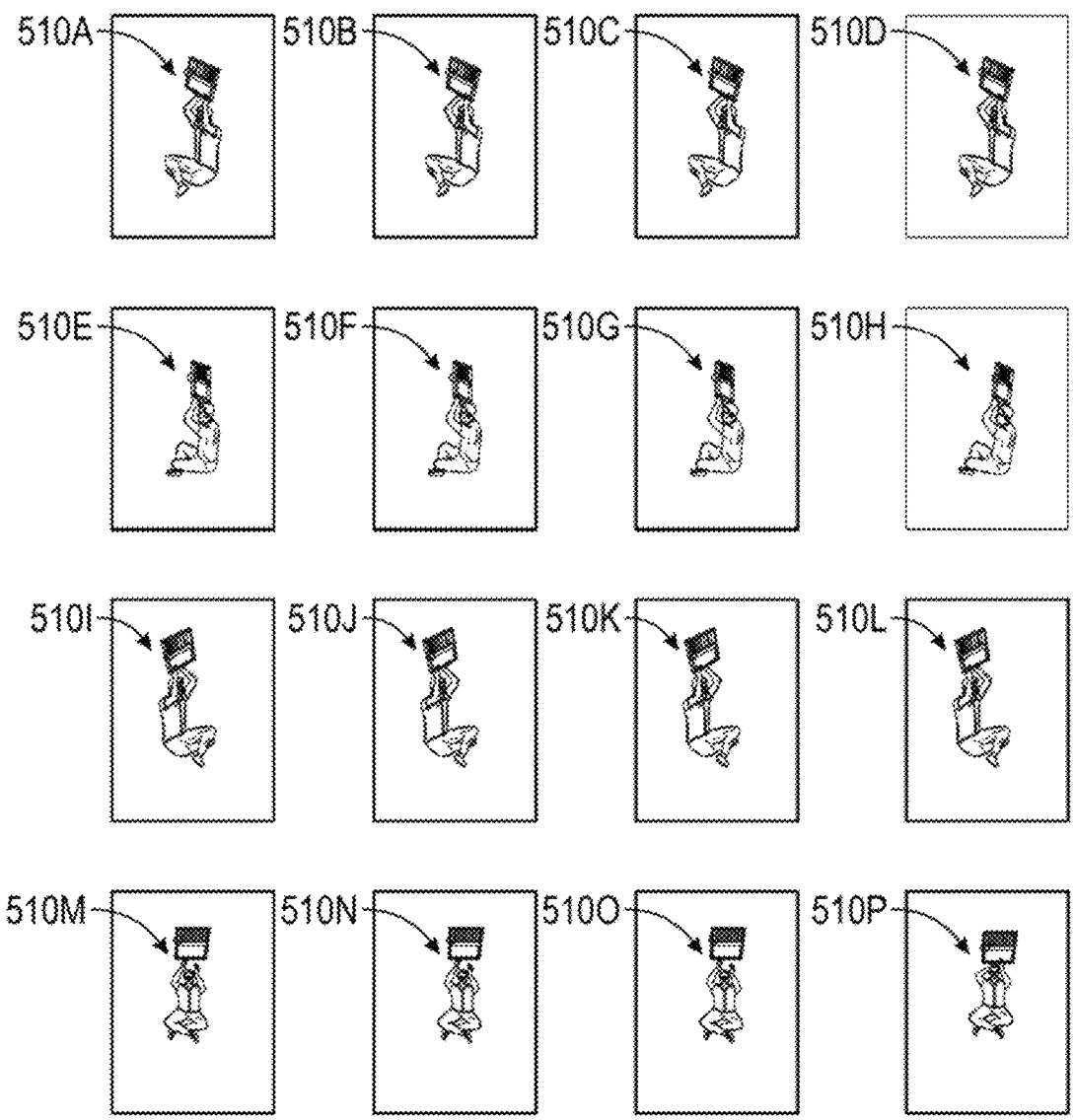
FIG. 5B illustrates example images of a portion of a calibration object in a multitude of images.

Reference will now be made to FIG. 5B, which illustrates example images of a portion 510A-510P of a calibration object in a multitude of images. In the illustrated example, 16 images of a calibration object are included. Each of the images includes a unique perspective of the calibration object. The system may analyze the images and identify a same portion 510A-510P of the calibration object. For example, the portion 510A-510P may represent a same corner.

The above-described corner may represent an example key-point, which the system may use to ensure that the ground-truth representation is properly compared to a same pose of the reconstructed object. For example, the system may identify the same corner in the ground-truth representation. The system may then rotate, or otherwise transform, the reconstructed object or ground-truth representation to be in a same pose.

The reconstruction quality information may represent deviations of the reconstructed object as compared with the ground-truth representation. The deviations may indicate determined differences between three-dimensional locations of points included in the reconstructed object and corresponding points included in the ground-truth representation. For example, the system may determine a point in the reconstructed object which is closest in position to a point in the ground-truth representation. The system may then determine a difference in position of the points (e.g., a difference in three-dimensional coordinates). This difference may represent an error associated with the reconstruction at the determined point.

The above-described differences may be included in a data structure, such as a vector. For example, the vector may indicate an error for each point in the reconstructed object. In some embodiments, the system may determine a measure of central tendency associated with the differences (e.g., a mean difference). Optionally, these differences may be performed per feature of the calibration object. As an example, errors associated with points forming a same feature may be analyzed. Thus, a measure of central tendency associated with differences per feature may be determined. To determine this measure, in some embodiments a norm (e.g., an L1 or L2 norm) may be computed based on the vector.

The system may also analyze the reconstructed object and ground-truth representation to determine statistical information. As an example, the system may determine that the perimeter of a rectangle represented in the reconstructed object is not formed from straight lines. It may be appreciated that a rectangle feature on the calibration object may be formed from two sets of substantially parallel lines (e.g., a first set forming a top/bottom and a second set forming a left/right of the rectangle). The system may analyze the points in the reconstructed object which form these lines. The system may then determine a variance associated with deviations from the ground-truth representation. In this way, the system may determine that the lines of the reconstructed object are slightly curved. The system may also determine that certain points were incorrectly placed outside of the lines in the reconstructed object. For example, due to reconstruction errors these points may have been incorrectly placed such that the lines have deviations in certain portions.

In some embodiments, the system may assign an overall quality score for the reconstructed object or for different features thereof. For example, a mean associated with the above-described vector may be determined. Based on a value of the mean, an overall quality may be determined. Similarly, the system may assign an overall quality score for each feature of the calibration object. For example, and with respect to each feature, a mean associated with the above-described vector for the feature may be determined.

Figure 6:
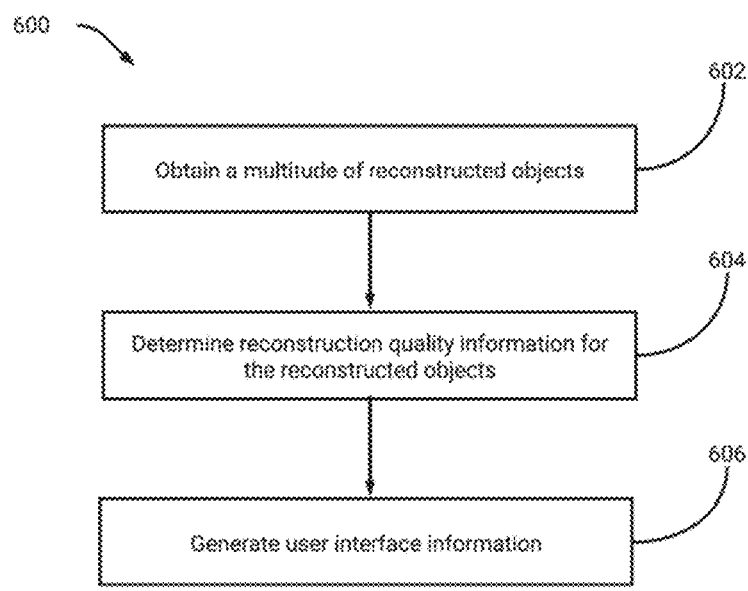
FIG. 6 illustrates a flowchart of an example process to determine reconstruction quality information for a volumetric capture stage.

FIG. 6 illustrates a flowchart of an example process 600 to determine reconstruction quality information for a volumetric capture stage. For convenience, the process 600 will be described as being performed by a system of one or more computers. For example, the system may be the quality determination system 400 described in FIG. 4.

At block 602, the system obtains a multitude of reconstructed objects. As described in FIGS. 3A-4, the system may generate a multitude of reconstructed objects. Each of the reconstructed objects may be associated with certain position and/or angle information.

At block 604, the system determines reconstruction quality information for the reconstructed objects. Thus, the system may determine error information based on a position and/or angle of the calibration object on the volumetric capture surface.

At block 606, the system generates user interface information. The user interface information may be presented via a user device in an interactive user interface. The interactive user interface may be presented via a web application, mobile application, desktop software, and so on.

The system may cause inclusion of analyses in the interactive user interface based on the determined reconstruction quality information. For example, the interactive user interface may present information identifying a smallest two-dimensional or three-dimensional feature which was reproduced with less than a threshold error for any position on the volumetric capture surface. The error, as described above, may be determined based on differences in positions of points between the reconstructed objects and the ground-truth representation. In some embodiments, the interactive user interface may present a graphical representation of the calibration object with the identified feature labeled or otherwise called-out.

The interactive user interface may additionally present a graphical representation of the volumetric capture surface. At different points on the surface, the interactive user interface may indicate a smallest two dimensional or three-dimensional feature which was reconstructed with less than a threshold error. In this way, a user may quickly view a summary of expected accuracies associated with positions on the volumetric capture surface.

As described in FIG. 4, the interactive user interface may additionally allow a user to quickly cycle through the reconstructed objects. The points, or polygons, of each reconstructed object may be assigned a particular color indicative of an error. For example, green may indicate that points, or polygons, of a reconstructed object were accurately reconstructed. As another example, red may indicate that points, or polygons, of a reconstructed object were inaccurately reconstructed. Definitions for accurate and inaccurate may vary based on the volume capture stage used, the camera type, the intended use of the system or quality data, etc. In this way, a user may quickly cycle through the reconstructed objects and view which portions of the calibration object are being reconstructed accurately across the volumetric capture surface.

The system may additionally indicate an optimal (e.g., lowest error) portion of the volumetric capture stage. For example, the interactive user interface may present a graphical representation of the volumetric capture stage. The interactive user interface may then identify a portion of the graphical representation which enables a real-world object to be reconstructed with a lowest error. In this way, a user may quickly view a location at which to place real-world objects.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A method implemented by a system of one or more computers, the method comprising: obtaining a plurality of images of a calibration object, the images being obtained from a plurality of image sensors positioned about the calibration object, and the calibration object having location information associated with a volumetric capture surface on which the calibration object is located, generating, based on the images, a reconstructed object associated with the calibration object, the reconstructed object representing a three-dimensional representation of the calibration object, determining reconstruction quality information associated with the reconstructed object, wherein the determination is based on a ground-truth representation of the calibration object, and outputting the reconstruction quality information.

Example Two: The method of example One, wherein the calibration object comprises a plurality of features, each feature being a physical portion of the calibration object.

Example Three: The method of example Two, wherein a first of the plurality of features comprises a two-dimensional feature.

Example Four: The method of example Three, wherein the two-dimensional feature is a substantially planar physical portion of the calibration object.

Example Five: The method of example Two, wherein a second of the plurality of features comprises a three-dimensional feature.

Example Six: The method of example Five, wherein the three-dimensional feature is a three-dimensional object.

Example Seven: The method of example Six, wherein a three-dimensional object comprises a cylinder, a sphere, a cube, or an arbitrary three-dimensional shape.

Example Eight: The method of example Two, wherein two features of the plurality of features are of different sizes along one or more axes.

Example Nine: The method of example Eight, wherein the two features represent cylinders, and wherein the cylinders have different radii.

Example Ten: The method of example Two, wherein two features of the plurality of features are physical portions with different textures thereon.

Example Eleven: The method of example Ten, wherein a texture is formed from wood, leather, and/or felt.

Example Twelve: The method of example One, wherein the three-dimensional representation is a point cloud or mesh.

Example Thirteen: The method of example Twelve, wherein the point cloud comprises points assigned respective three-dimensional locations, the three-dimensional locations being with respect to a camera view associated with the image sensors.

Example Fourteen: The method of example Thirteen, wherein the camera view is determined based on extrinsic and/or intrinsic parameters associated with the image sensors.

Example Fifteen: The method of example One, wherein the ground-truth representation represents a scan of the calibration object with greater than a threshold accuracy.

Example Sixteen: The method of example One, wherein the ground-truth representation is a computer-aided design (CAD) model.

Example Seventeen: The method of example Sixteen, wherein the calibration object is printed using a three-dimensional printer based on the CAD model.

Example Eighteen: The method of example One, wherein the ground-truth representation is a particular point cloud with greater than a threshold density of points.

Example Nineteen: The method of example Eighteen, wherein determining reconstruction quality information comprises: identifying, for each point in a point cloud forming the reconstructed object, a closest point in the particular point cloud forming the ground-truth representation, determining, for each point based on the respective identification, a measure of difference between a location of the point and the closest point in the particular point cloud, and generating data structure storing differences between points in the point cloud and points in the particular point cloud.

Example Twenty: The method of example Nineteen, wherein the reconstruction quality information indicates a measure of central tendency generated based on the data structure.

Example Twenty-one: The method of example Twenty, wherein the measure of central tendency indicates a mean difference between points in the point cloud and points in the particular point cloud.

Example Twenty-two: The method of example Eighteen, wherein the data structure stores differences between points associated with a first feature in the point cloud and points associated with the first feature in the particular point cloud.

Example Twenty-three: The method of example One, wherein the reconstruction quality information is indicative of an accuracy associated with the reconstructed object.

Example Twenty-four: The method of example Twenty-three, wherein the calibration object comprises a plurality of features, each feature being a physical portion of the calibration object, and wherein the reconstruction quality information is indicative of respective accuracies associated with the features of the reconstructed object.

Example Twenty-five: The method of example One, wherein the calibration object comprises a plurality of features, each feature being a physical portion of the calibration object, and wherein the reconstruction quality information indicates one or more features associated with reconstruction accuracies less than a threshold.

Example Twenty-six: The method of example Twenty-five, wherein the reconstruction quality information indicates a smallest of the features associated with a reconstruction accuracy greater than a threshold.

Example Twenty-seven: The method of example One, wherein the reconstruction quality information indicates a score associated with the reconstructed object.

Example Twenty-eight: The method of example One, wherein the calibration object comprises a plurality of features, each feature being a physical portion of the calibration object, and wherein the reconstruction quality information indicates respective scores associated with the features.

Example Twenty-nine: The method of example One, wherein a plurality of reconstructed objects are generated, and wherein each reconstructed object is generated based on images of the calibration information having different location information.

Example Thirty: The method of example Twenty-nine, wherein the location information indicates a two-dimensional position on the volumetric capture surface, and wherein the reconstruction quality information indicates reconstruction accuracies for two-dimensional positions.

Example Thirty-one: The method of examples one through Thirty, wherein the reconstruction quality information is output for inclusion in an interactive user interface.

Example Thirty-two: The method of example Twenty-nine through Thirty-one, wherein the interactive user interface:

presents one of the reconstructed objects, wherein points in the reconstructed object are assigned respective colors based on a measure of difference between the points and points included in the ground-truth representation.

Example Thirty-three: The method of example Thirty-two, wherein the interactive user interface:

responds to user input associated with presentation of the reconstructed objects, wherein the interactive user interface enables cycling through the reconstructed objects, wherein each reconstructed object comprises points assigned respective colors.

Example Thirty-four: A system comprising one or more computers and non-transitory computer storage media storing instructions that when executed by the one or more computers, cause the computers to perform the method of examples One through Thirty-three.

Example Thirty-five: Non-transitory computer storage media storing instructions that when executed by a system of one or more computers, cause the one or more computers to perform the method of examples One through Thirty-three.

Example Thirty-six: A calibration object, the calibration object comprising a plurality of features, each feature being a physical portion of the calibration object, and each feature being a two-dimensional feature or a three-dimensional feature, wherein at least a portion of the features are of differing sizes and/or textures, and wherein the calibration object is configured for imaging via image sensors of a volumetric capture stage and use for determining reconstruction accuracies associated with different positions on the volumetric capture stage.

Example Thirty-seven: A method implemented by a system of one or more computers, the method comprising: obtaining a plurality of reconstructed objects, each reconstructed object being a three-dimensional representation of a calibration object placed at a respective position of a plurality of positions on a stage, wherein image sensors are positioned about the stage, accessing a ground-truth representation of the calibration object, and determining, based on the reconstructed objects and the ground-truth representation, reconstruction quality information associated with the positions on the stage.

Example Thirty-eight: The method of example Thirty-seven, wherein two or more of the reconstructed objects are three-dimensional representations of the calibration object placed a same position, and wherein an angle about one or more axes is different.

Example Thirty-nine: A system comprising one or more computers and non-transitory computer storage media storing instructions that when executed by the one or more computers, cause the computers to perform the method of examples Thirty-seven through Thirty-eight.

Example Forty: Non-transitory computer storage media storing instructions that when executed by a system of one or more computers, cause the one or more computers to perform the method of examples Thirty-seven through Thirty-eight.

As noted above, implementations of the described examples provided above may include hardware, a method or process, and/or computer software on a computer-accessible medium.

Other Embodiments

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

In addition, it will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (260), the remote processing module (270), and remote data repository (280). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims.

Accordingly, the claims are not intended to be limited to the embodiments shown herein, but are to be accorded the widest scope consistent with this disclosure, the principles and the novel features disclosed herein.

What is claimed is:

1. A method implemented by a system of one or more computers, the method comprising:
    obtaining a plurality of images of a calibration object, the images being obtained from a plurality of image sensors positioned about the calibration object, and the calibration object having location information associated with a volumetric capture surface on which the calibration object is located;
    generating, based on the images, a reconstructed object associated with the calibration object, the reconstructed object representing a three-dimensional representation of the calibration object;
    determining reconstruction quality information associated with the reconstructed object, wherein the determination is sed on a ground-truth representation of the calibration object, and wherein determining the reconstruction quality information comprises:
        identifying, for each point in a point cloud forming the reconstructed object, a closest point in a particular point cloud forming the ground-truth representation,
        determining, for each point based on the respective identification, a measure of difference between a location of the point and the closest point in the particular point cloud, and
        generating a data structure storing differences between points in the point cloud and points in the particular point cloud; and
    outputting the reconstruction quality information.

2. The method of claim 1, wherein the calibration object comprises a plurality of features, each feature being a physical portion of the calibration object.

3. The method of claim 2, wherein a first of the plurality of features comprises a two-dimensional feature.

4. The method of claim 3, wherein the two-dimensional feature is a planar physical portion of the calibration object.

5. The method of claim 2, wherein two features of the plurality of features are of different sizes along one or more axes.

6. The method of claim 5, wherein the two features represent cylinders, and wherein the cylinders have different radii.

7. The method of claim 1, wherein the point cloud comprises points assigned respective three-dimensional locations, the three-dimensional locations being with respect to a camera view associated with the image sensors.

8. The method of claim 1, wherein the ground-truth representation represents a scan of the calibration object with greater than a threshold accuracy.

9. The method of claim 1, wherein the particular point cloud has greater than a threshold density of points.

10. The method of claim 1, wherein the reconstruction quality information indicates a measure of central tendency generated based on the data structure.

11. The method of claim 10, wherein the measure of central tendency indicates a mean difference between points in the point cloud and points in the particular point cloud.

12. The method of claim 11, wherein the data structure stores differences between points associated with a first feature in the point cloud and points associated with the first feature in the particular point cloud.

13. The method of claim 1, wherein the calibration object comprises a plurality of features, each feature being a physical portion of the calibration object, and wherein the reconstruction quality information is indicative of respective accuracies associated with the features of the reconstructed object.

14. The method of claim 1, wherein the calibration object comprises a plurality of features, each feature being a physical portion of the calibration object, and wherein the reconstruction quality information indicates one or more features associated with reconstruction accuracies less than a threshold.

15. The method of claim 1, wherein the reconstruction quality information is output for inclusion in an interactive user interface.

16. The method of claim 15, wherein the interactive user interface:
presents the reconstructed object, wherein points in the reconstructed object are assigned respective colors based on a measure of difference between the points and points included in the ground-truth representation.

17. The method of claim 16, wherein a plurality of reconstructed objects are determined for different locations of the calibration object on the volumetric calibration surface, and wherein the interactive user interface:
enables cycling through presentation of the reconstructed objects, wherein each reconstructed object comprises points assigned respective colors.

18. A computing system comprising:
a hardware computer processor;
a non-transitory computer readable medium having software instructions stored thereon, the software instructions executable by the hardware computer processor to cause the computing system to perform operations comprising:
obtaining a plurality of images of a calibration object, the images being obtained from a plurality of image sensors positioned about the calibration object, and the calibration object having location information associated with a volumetric capture surface on which the calibration object is located;
generating, based on the images, a reconstructed object associated with the calibration object, the reconstructed object representing a three-dimensional representation of the calibration object;
determining reconstruction quality information associated with the reconstructed object, wherein the determination is based on a ground-truth representation of the calibration object, and wherein determining the reconstruction quality information comprises:
identifying, for each point in a point cloud forming the reconstructed object, a closest point in a particular point cloud forming the ground-truth representation,
determining, for each point based on the respective identification, a measure of difference between a location of the point and the closest point in the particular point cloud, and
generating a data structure storing differences between points in the point cloud and points in the particular point cloud; and
outputting the reconstruction quality information.

19. A non-transitory computer readable medium having software instructions stored thereon, the software instructions executable by a hardware computer processor to cause a computing system to perform operations comprising:
obtaining a plurality of images of a calibration object, the images being obtained from a plurality of image sensors positioned about the calibration object, and the calibration object having location information associated with a volumetric capture surface on which the calibration object is located;
generating, based on the images, a reconstructed object associated with the calibration object, the reconstructed object representing a three-dimensional representation of the calibration object;
determining reconstruction quality information associated with the reconstructed object, wherein the determination is based on a ground-truth representation of the calibration object; and
outputting, via an interactive user interface, the reconstruction quality information wherein the interactive user interface:
presents the reconstructed object, wherein points in the reconstructed object are assigned respective colors based on a measure of difference between the points and points included in the ground-truth representation.

20. A method implemented by a system of one or more computers, the method comprising:
obtaining a plurality of images of a calibration object, the images being obtained from a plurality of image sensors positioned about the calibration object, and the calibration object having location information associated with a volumetric capture surface on which the calibration object is located;
generating, based on the images, a reconstructed object associated with the calibration object, the reconstructed object representing a three-dimensional representation of the calibration object;
determining reconstruction quality information associated with the reconstructed object, wherein the determination is based on a ground-truth representation of the calibration object; and
outputting, via an interactive user interface, the reconstruction quality information, wherein the interactive user interface:
presents the reconstructed object, wherein points in the reconstructed object are assigned respective colors based on a measure of difference between the points and points included in the ground-truth representation.

21. The method of claim 20, wherein a plurality of reconstructed objects are determined for different locations of the calibration object on the volumetric calibration surface, and wherein the interactive user interface:

enables cycling through presentation of the reconstructed objects, wherein each reconstructed object comprises points assigned respective colors.

22. The method of claim 20, wherein the calibration object comprises a plurality of features, each feature being a physical portion of the calibration object, and wherein the reconstruction quality information is indicative of respective accuracies associated with the features of the reconstructed object.

23. The method of claim 20, wherein determining the reconstruction quality information comprises:
- identifying, for each point in a point cloud forming the reconstructed object, a closest point in a particular point cloud forming the ground-truth representation,
- determining, for each point based on the respective identification, a measure of difference between a location of the point and the closest point in the particular point cloud, and
- generating a data structure storing differences between points in the point cloud and points in the particular point cloud.

* * * * *